United States Patent
Ander et al.

(10) Patent No.: US 6,301,342 B1
(45) Date of Patent: Oct. 9, 2001

(54) METHOD RELATING TO TELEPHONE COMMUNICATIONS INCLUDING THE TRANSMISSION OF ADVERTISING MESSAGES

(75) Inventors: Carl Ander, Djursholm; Fredrik Palmaeus, Stockholm, both of (SE)

(73) Assignee: Gratistelefon Svenska AB, Stockholm (SE)

(*) Notice: Subject to any disclaimer, the term of this patent is extended or adjusted under 35 U.S.C. 154(b) by 0 days.

(21) Appl. No.: 09/355,174

(22) PCT Filed: Jan. 19, 1998

(86) PCT No.: PCT/SE98/00077
§ 371 Date: Sep. 23, 1999
§ 102(e) Date: Sep. 23, 1999

(87) PCT Pub. No.: WO98/34392
PCT Pub. Date: Aug. 6, 1998

(30) Foreign Application Priority Data
Feb. 3, 1997 (SE) .................................................. 9700334

(51) Int. Cl.[7] ............................. H04M 15/00; H04M 1/64
(52) U.S. Cl. ................... 379/114.13; 379/87; 379/88.18; 379/88.25; 379/112.09; 379/114.1
(58) Field of Search .................................. 379/72, 84, 87, 379/88.04, 88.18, 88.22, 88.23, 88.25, 112, 114, 115, 207, 67.1, 121, 257

(56) References Cited

U.S. PATENT DOCUMENTS

| | | | |
|---|---|---|---|
| 4,850,007 | * 7/1989 | Marino et al. | 379/67.1 |
| 5,448,625 | * 9/1995 | Lederman | 379/112 |
| 5,729,598 | * 3/1998 | Kay | 379/115 |
| 5,793,851 | * 8/1998 | Albertson | 379/114 |
| 5,870,724 | * 2/1999 | Lawlor et al. | 705/42 |
| 5,987,424 | * 11/1999 | Nakamura | 705/14 |
| 6,102,406 | * 8/2000 | Miles et al. | 273/430 |

* cited by examiner

Primary Examiner—Binh Tieu
(74) Attorney, Agent, or Firm—Alfred J. Mangels

(57) ABSTRACT

A method relating to telecommunications in which the telephone of a first subscriber is connected to the telephone of a second subscriber via a standard telephone network and the call is billed to a third subscriber. The first subscriber first dials a subscriber number, preferably preceded by a prefix, which leads to the third subscriber and then dials a subscriber number that leads to the second subscriber. The telephone network connects the call to a telephone-network-connected computer unit that forwards the call to the second subscriber to connect the first subscriber with the second subscriber. The call between the first subscriber and the second subscriber is billed to the third subscriber, and advertisements are transmitted on the call connected between the first and second subscribers. When one of the first subscriber and the second subscriber enters a code or the like through the keypad of his or her telephone during an ongoing call, the computer unit senses the code, and upon sensing the code the computer unit interrupts the transmission of advertisements during the course of the call. The computer unit bills the remainder of the connected call in accordance with fixed telephone charges.

6 Claims, 1 Drawing Sheet

METHOD RELATING TO TELEPHONE COMMUNICATIONS INCLUDING THE TRANSMISSION OF ADVERTISING MESSAGES

BACKGROUND OF THE INVENTION

1. Field of the Invention

The present invention pertains to a method relating to telecommunications wherein a call is connected between two subscribers and the call is billed to a third subscriber, and wherein advertisements are transmitted during the course of the call.

2. Description of the Related Art

Swedish Patent No. 9403793-4 teaches a method of forwarding and billing a telephone call wherein a first subscriber telephone is connected to a second subscriber telephone via a standard telephone network. The standard telephone network may be either a fixed network or a mobile telephone network.

According to that patent specification, a call connection is set up by virtue of the first subscriber dialling a prefix followed by a subscriber number that leads to a third subscriber and then dialling a subscriber number that leads to a second subscriber. This procedure results in the setup of a connection between the first and the second subscribers while billing the third subscriber for the call between said first and second subscribers.

The prefix and subscriber number causes the telephone network to connect the call through the telephone network to a network connected computer unit of the third subscriber. The prefix also causes the computer unit to forward the call to the second subscriber via said computer unit, so as to connect the first subscriber with the second subscriber.

According to the aforesaid patent specification, the computer unit is caused to transmit advertisements or publicity media at given time intervals during the duration of the call connected between the first and the second subscribers.

For instance, a chain of hamburger restaurants or a chain of gas stations may transmit during the course of the call connection advertisements relating to sales offers or ongoing campaigns.

In this case, the first subscriber is not billed for the call to the second subscriber, or is only billed for a part of the call, while a company or an organization is able to advertise its activities to the first and the second subscribers.

One problem with call connections of this kind is, of course, that the transmitted advertising messages interrupt the conversation held by the persons involved while the advertisement is transmitted. This can be very annoying to persons who do not wish to be constantly interrupted in this way.

Such a situation can occur when a subscriber utilizes the possibility of phoning free of charge, by setting up a connection with a second subscriber on a facility in which advertisements are transmitted but where the second subscriber has something important to say or discuss or when the call has developed along lines in which the persons involved no longer wish to be interrupted by advertising messages.

The present invention solves this problem.

SUMMARY OF THE INVENTION

The present invention is thus concerned with a method relating to telecommunications call is connected between two subscribers, the call is billed to a third subscriber, wherein a first subscriber telephone is connected to a second subscriber first telephone via a standard telephone network, wherein the first subscriber dials a subscriber number, preferably preceded by a prefix, that leads to the third subscriber and then dials a subscriber number that leads to the second subscriber, the telephone network is caused to connect the call to a telephone network connected computer unit that forwards the call to said second subscriber to connect said first subscriber with said second subscriber, the call between the first and the second subscriber is billed to the third subscriber, and advertisements or like messages are transmitted on the call connection between the first and the second subscriber. When one of the first and the second subscribers enters a code or the like through the keypad of the telephone concerned during an ongoing call, said computer unit senses said code; and upon sensing the code, the computer unit interrupts transmission of advertisements during the course of said call; the computer unit bills the remainder of the connected call in accordance with fixed telephone tariffs.

BRIEF DESCRIPTION OF THE DRAWINGS

The invention will now be described in more detail with reference to an exemplifying embodiment thereof and also with reference to the accompanying drawing, in which.

DESCRIPTION OF THE PREFERRED EMBODIMENTS

Figure 1:
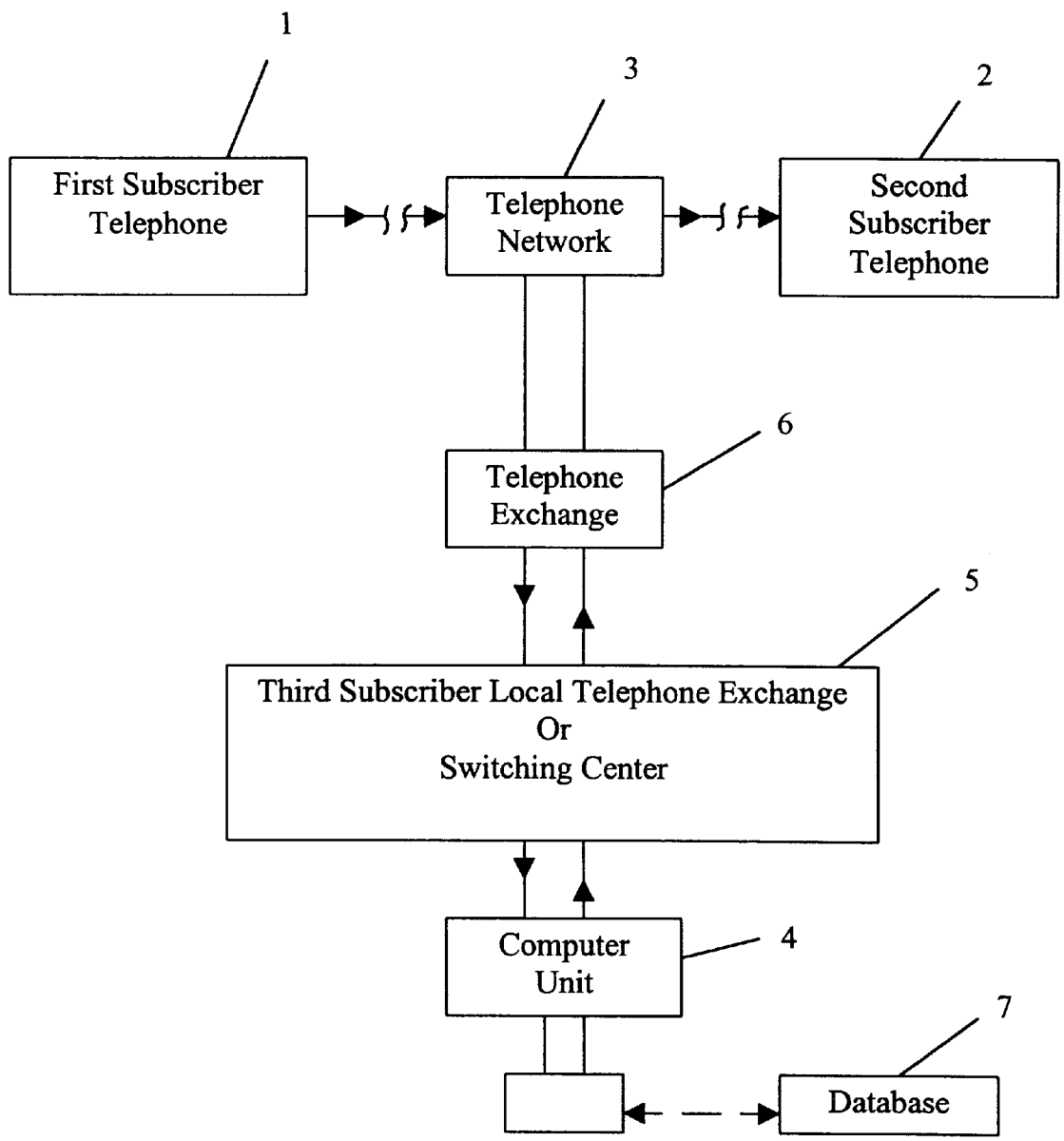
FIG. 1 is a block schematic that illustrates an arrangement for carrying out the present method.

FIG. 1 illustrates an inventive arrangement for forwarding and billing a telephone call, wherein a first subscriber telephone 1 is connected to a second subscriber telephone 2 via a standard telephone network, generally referenced as 3.

A third subscriber has a computer unit 4 that is connected to the telephone network 3. The computer unit 4 is adapted to sense a prefix dialled by a first subscriber and followed by a subscriber number that leads to the third subscriber. The third subscriber may have a local telephone exchange or switching center 5 to which the computer unit 4 is connected. The telephone exchange 5 may be adapted to connect incoming calls to the computer unit 4 in response to sensing the prefix. When sensing the prefix, the computer unit 4 functions to forward the call, via the telephone network 3, to a subscriber number dialled by the first subscriber after the first-mentioned subscriber number and leading to a second subscriber, so as to connect the first subscriber with the second subscriber.

The telephone network 3 is also adapted to bill the call connected between the first and the second subscriber to the subscription of the third subscriber when sensing said prefix. In this regard, the whole of the cost of the call may be billed to the third subscriber or, alternatively, only a part of said cost and the remainder of the cost billed to the calling subscriber. The prefix is conveniently sensed in a telephone exchange 6 or switching centre of a telephone station belonging to the telephone network for billing purposes. Advertisements are transmitted on the call connection between the first and second subscribers at different time intervals.

In this regard, the computer unit 4 is arranged in communication with a database 7 that contains advertising material.

The database 7, or some other database, includes a plurality of advertising messages in the form of recordings on data media. These advertising messages are appropriately categorized in a suitable order. For instance, the advertising messages may be categorized according to age, sex, earnings and housing district of respective subscribers.

The computer unit is caused to retrieve collect advertising messages from the database in a predetermined order and transmit these messages on the call connection. Since the telephone numbers of the first and the second subscribers will reveal the districts in which said subscribers live, the computer unit is able to retrieve advertising messages that are local with respect to the areas or districts in which the two subscribers are located. The subscribers may also be categorized in another database or in the same database, in which a profile of each calling subscriber that has a subscription with the third subscriber is stored. In this regard, the computer arrangement may be adapted to retrieve advertising messages that suit respective profiles of the subscribers concerned and transmit these messages to that subscriber.

The prefix may be the subscriber number of the third subscriber, or some other number or a code that includes the star character and/or the pound character. Both the subscriber number and the prefix may be numerical or alphanumerical or solely consist of letters.

According to the present invention, when one of the first subscriber and the second subscriber enters a code or the like through the keypad of the telephone concerned during the course of the conversation, the computer unit is caused to sense this code. The code may be any appropriate code, such as a code *99*, i.e. including the star character or the pound character, or solely one or more digits.

According to the invention, the computer unit 4 is caused to cease transmitting advertisements during the remainder of the conversation when sensing this code. The computer unit 4 is then caused to bill the remainder of the call in accordance with preset tariffs.

The call may either be billed to one of the subscribers by the telephone operator whose telephone network was used for the call, or it may be billed to one of the first and the second subscribers by the third subscriber.

In the former case, the computer unit 4 will deliver a signal to the network 3 of the telephone operator and therewith cause the telephone operator to begin to time count the call in a conventional manner, whereafter billing is effected in a normal way via the telephone operator to whom the subscriber concerned subscribes.

In the latter case, the computer unit 4 is caused to commence a time count, whereafter the third subscriber bills the subscriber concerned in accordance with a given tariff. This would appropriately require a subscriber agreement between said subscriber and the third subscriber.

It is preferred that only that part of the call which is free from advertisement is billed.

According to one preferred embodiment; the computer unit 4 is caused to bill the calling subscriber after sensing said code.

According to one alternative embodiment, the computer unit 4 is caused to bill the subscriber that dials the code on his/her telephone, after sensing said code. Thus, in this embodiment, it is the subscriber who wishes to interrupt the transmission of advertisements that will be billed for the call.

According to one preferred embodiment, when one of the first and the second subscribers again enters a code or the like through the keypad of the telephone concerned during the course of the call, the computer unit is caused to sense said code and, in response to sensing said code, again caused to transmit advertisements on the call connection.

This means that transmission of an advertisement can be prevented during a given part of the call.

When an advertisement is again transmitted on the call connection, the computer unit is caused to bill the third subscriber for the continued call for the duration of the advertisement transmission.

Although the invention has been described with reference to exemplifying embodiments thereof, it will be obvious that modifications can be made. For instance, it will be evident that the codes may be configured in different appropriate ways. It will also be evident that entering of the code sensed by the computer unit can be followed by voice messages. For instance, after sensing the first-mentioned code which stops the transmission of advertisements, the computer unit may be caused to send a voice message to the effect that "The call will be billed to the calling subscriber as from now".

It will therefore be understood that the invention is net restricted to the aforedescribed exemplifying embodiments and that modifications can be made within the scope of the following, claims.

What is claimed is:

1. A method relating to telecommunications, wherein a telephone call is connected between two subscribers via a standard telephone network and the call is billed to a third subscriber, said method comprising the steps of:

a. placing a telephone call from a first subscriber telephone by dialing a third subscriber telephone exchange and a first predetermined code and then dialing from the first subscriber's telephone a second subscriber telephone number;

b. connecting the first subscriber's telephone with a computer unit connected with the third subscriber's telephone exchange in response to the detection of the first predetermined code by the third subscriber's telephone exchange;

c. connecting the first subscriber's telephone with the second subscriber's telephone through the telephone network;

d. transmitting an advertising message during the call connection between the first subscriber and the second subscriber;

e. terminating the transmission of advertisements upon the entry of a second predetermined code using a keypad of one of the first subscriber and the second subscriber telephones; and f. billing to the third subscriber the cost of the call connection to the time advertising messages are terminated, and billing the cost of the call connection from the time of termination of the transmission of advertising messages in accordance with fixed telephone charges to a party other than the third subscriber.

2. A method according to claim 1, wherein the cost of the call connection subsequent to sensing said second predetermined code is billed to the first subscriber.

3. A method according to claim 1, wherein the cost of the call connection subsequent to sensing said second predetermined code is billed to the subscriber who entered the second predetermined code.

4. A method according to claim 1, including the step of resuming the transmission of advertisements upon the entry of a third predetermined code using the keypad of one of the first subscriber and the second subscriber telephones during the course of the call connection, and billing the third subscriber for the cost of the resumed call connection from the time the third predetermined code is entered and for the duration of advertisement transmission.

5. A method relating to telecommunications, wherein a telephone call is connected between two subscribers via a standard telephone network and the call is billed to a third subscriber, said method comprising the steps of:

a. placing a telephone call from a first subscriber telephone by dialing a third subscriber telephone exchange and a first predetermined code and then dialing from the first subscriber's telephone a second subscriber telephone number;

b. connecting the first subscriber's telephone with a computer unit connected with the third subscriber's telephone exchange in response to the detection of the first predetermined code by the third subscriber's telephone exchange;

c. connecting the first subscriber's telephone with the second subscriber's telephone through the telephone network;

d. transmitting an advertising message during the call connection between the first subscriber and the second subscriber;

e. interrupting the transmission of advertisements upon the entry of a second predetermined code using a keypad of one of the first subscriber and the second subscriber telephones;

f. billing to the third subscriber the cost of the call connection to the time advertising messages are interruted, and billing the cost of the call connection from the time of interruption of the transmission of advertising messages to the first subscriber in accordance with fixed telephone charges; and g. resuming the transmission of advertisements upon the entry of a third predetermined code using the keypad of one of the first subscriber and the second subscriber telephones during the course of the call connection, and billing the third subscriber for the cost of the resumed call connection from the time the third predetermined code is entered.

6. A method relating to telecommunications, wherein a telephone call is connected between two subscribers via a standard telephone network and the call is billed to a third subscriber, said method comprising the steps of:

a. placing a telephone call from a first subscriber telephone by dialing a third subscriber telephone exchange and a first predetermined code and then dialing from the first subscriber's telephone a second subscriber telephone number;

b. connecting the first subscriber's telephone with a computer unit connected with the third subscriber's telephone exchange in response to the detection of the first predetermined code by the third subscriber's telephone exchange;

c. connecting the first subscriber's telephone with the second subscriber's telephone through the telephone network;

d. transmitting an advertising message during the call connection between the first subscriber and the second subscriber;

e. interrupting the transmission of advertisements upon the entry of a second predetermined code using a keypad of one of the first subscriber and the second subscriber telephones;

f. billing to the third subscriber the cost of the call connection to the time advertising messages are interrupted, and billing the cost of the call connection from the time of interruption of the transmission of advertising messages to the subscriber who entered the second predetermined code in accordance with fixed telephone charges; and g. resuming the transmission of advertisements upon the entry of a third predetermined code using the keypad of one of the first subscriber and the second subscriber telephones during the course of the call connection, and billing the third subscriber for the cost of the resumed call connection from the time the third predetermined code is entered.

* * * * *